(12) United States Patent
Kraus

(10) Patent No.: US 7,880,635 B2
(45) Date of Patent: Feb. 1, 2011

(54) COLOR MESSAGING LENS

(75) Inventor: Karen M. Kraus, Farmington Hills, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 657 days.

(21) Appl. No.: 11/851,641

(22) Filed: Sep. 7, 2007

(65) Prior Publication Data

US 2009/0066532 A1   Mar. 12, 2009

(51) Int. Cl.
*G08B 5/00* (2006.01)

(52) U.S. Cl. .............................. 340/815.4; 340/815.45; 340/461; 340/691.4; 340/438; 362/26

(58) Field of Classification Search ................ 340/461, 340/691.4, 815.45, 815.4, 438; 359/440; 362/26, 489, 31, 545, 800, 487; 116/62.1
See application file for complete search history.

(56) References Cited

U.S. PATENT DOCUMENTS

| | | | |
|---|---|---|---|
| 2,907,869 A | 10/1959 | Hudson et al. | |
| 3,761,703 A | 9/1973 | Mund et al. | |
| 4,926,331 A | 5/1990 | Windle et al. | |
| 6,367,940 B1 | 4/2002 | Parker et al. | |
| 6,404,333 B1 | 6/2002 | Ayres et al. | |
| 2002/0085366 A1 | 7/2002 | Angell et al. | |
| 2004/0085746 A1 | 5/2004 | Chen | |
| 2005/0040963 A1* | 2/2005 | Lo | 340/815.45 |
| 2006/0164332 A1* | 7/2006 | Matti et al. | 345/32 |

OTHER PUBLICATIONS

U.S. Appl. No. 11/746,309, Kraus.

* cited by examiner

*Primary Examiner*—Anh V La
(74) *Attorney, Agent, or Firm*—Brinks Hofer Gilson & Lione

(57) ABSTRACT

An enhanced color messaging instrument gauge assembly is disclosed having a lens with one or more surface interruptions. A lens covering an instrument cluster transmits colored light longitudinally from at least one light source near its edge. Light encountering the surface interruption causes the surface interruption to illuminate. In one embodiment, different colored light can be coordinated with activation of symbols on the instrument cluster to attract the attention of an operator to an abnormal operating condition or to reinforce other information being communicated to the operator on the instrument cluster.

17 Claims, 2 Drawing Sheets

COLOR MESSAGING LENS

BACKGROUND OF THE INVENTION

This invention relates to instrument panels, and more particularly to conveying information to an operator, such as warnings or operational status, using a protective lens or mask which covers the gauges of the instrument panel.

Instrument panels in use today commonly convey a great variety of information to the operator via gauges, warning lights, and operational status lights. As appliqués and gauges become more colorful, small colored symbols become more difficult to notice. In some applications, particularly motor vehicles, a warning symbol may be relatively small and difficult to distinguish from other information on the instrument panel. This problem is exacerbated in the case of an operator who is color-blind. It would be useful to illuminate a larger area to alert the operator of driving parameters. It would also be useful to assign different colors to different zones of the instrument panel to allow the operator, including a color-blind driver, to differentiate between information that is urgent from information that information that is less serious.

BRIEF SUMMARY OF THE INVENTION

The present invention is an enhanced color messaging instrument panel of a type having gauges, indicators, and other visible signals, and in communication with a microprocessor or controller. The enhanced instrument panel comprises a protective lens or mask which carries light longitudinally from a light source, such as an LED in communication with the controller. The lens picks up light from the perimeter of the lens and transmits it to a point on the lens where there is a surface interruption. The surface interruption on the lens causes the interruption to be illuminated by the light generated by the light source. The light source or sources, which can be different colors, can transmit multiple colors to the same area of the lens. In another embodiment, a color can illuminate a prescribed area of the lens, with different areas assigned specific colors corresponding to the degree of seriousness of an operating condition.

DETAILED DESCRIPTION OF THE INVENTION

The following description of preferred embodiments is merely exemplary in nature and is in no way intended to limit the invention or its application or uses.

Figure 1:
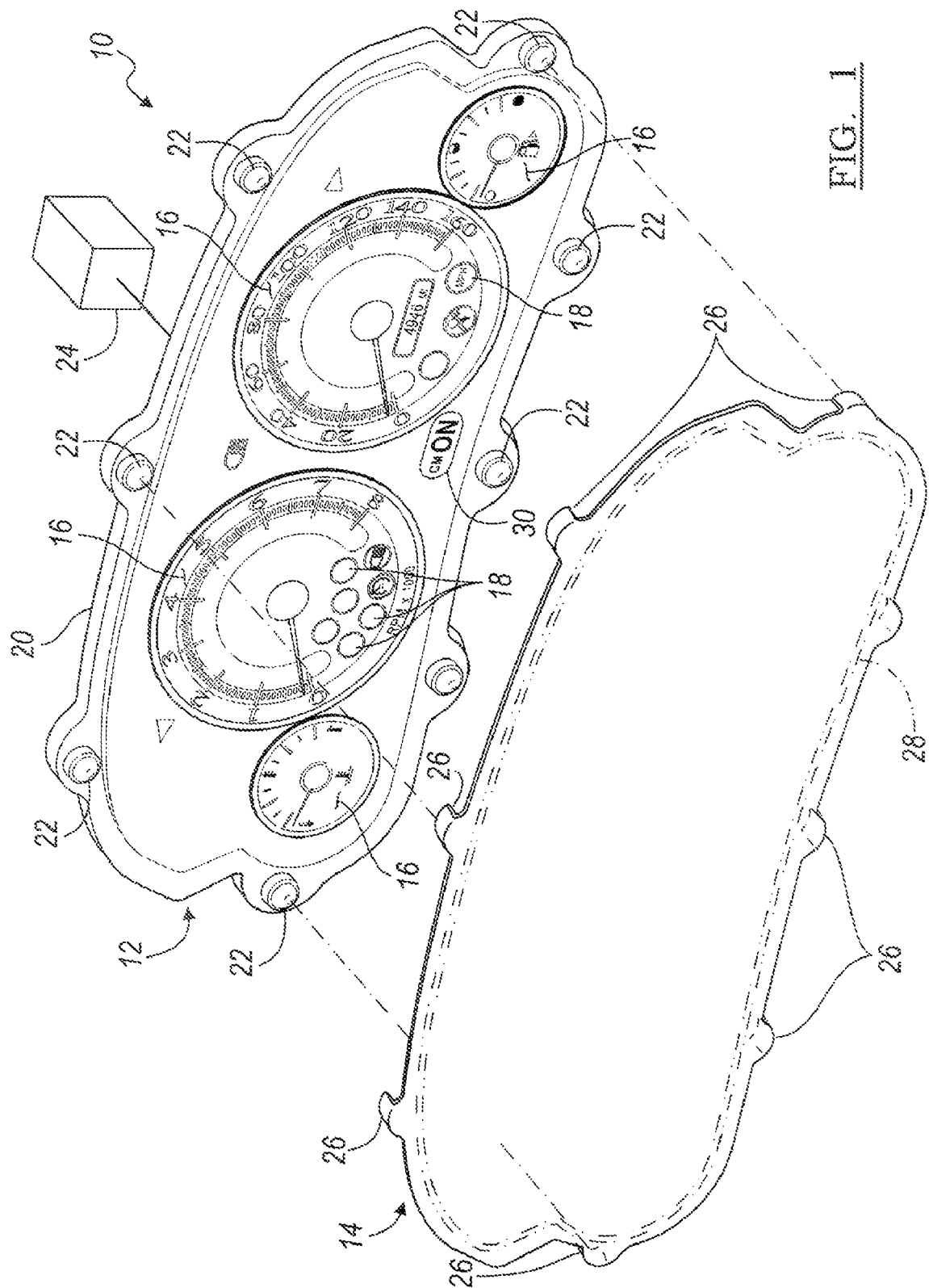
FIG. 1 is an exploded perspective view of an embodiment of the invention showing an instrument gauge assembly with a lens adapted for perimeter lighting.

The present invention is a messaging system for an instrument panel, including the kind used in a motor vehicle. FIG. 1 is an exploded view showing an enhanced motor vehicle instrument gauge assembly 10 disassembled into two main parts, an instrument cluster assembly 12 and a clear mask, or lens 14. Instrument cluster assembly 12 has a variety of gauges 16 which transmit familiar information to the operator such as speed, fuel, and engine speed. Instrument cluster assembly 12 also includes illuminable symbols 18. Symbols 18 convey information to the vehicle driver, such as information including routine operation status, such as high beam or low beam headlight position, all-wheel drive status, anti-lock brake operation, and other operation parameters. Symbols 18 also include items such as a check-engine indicator, low fuel, and other non-emergency warnings. Finally, symbols 18 can include symbols indicating an operating condition requiring immediate attention, such as a fasten seat belt symbol or absence of engine oil pressure. Although FIG. 1 shows an instrument gauge assembly of the type ordinarily located immediately forward of a seated automobile operator, "instrument gauge assembly" in this specification and the claims would include an application where gauges and symbols were displayed elsewhere, such as in a center stack display on the instrument panel or forward console. Indeed, the invention could be embodied in any information cluster, such as a consumer hand-held device such as a cell phone, or other analog and/or digital displays involving the presence of an operator.

The instrument cluster assembly 12 is mounted on or located in close proximity to a printed wiring board (PWB) 20. Preferably, PWB 20 has at least one light source 22 attached to its surface. In one embodiment, light source 22 is a tri-color light emitting diode (LED). However, the light source 22 could be comprised of a single color light source, such as an LED, or a plurality of different-colored light sources in the same immediate vicinity, or a plurality of different-colored light sources installed near different peripheral areas of the instrument cluster assembly 12.

Gauges 16 and symbols 18 are in communication with a controller 24, such as a microprocessor. Controller 24 transmits signals to gauges 16 and symbols 18, including signals relating to abnormal operation conditions, causing them to display information to the operator. Lens 14 may be used with analog or digital displays 16 on instrument cluster 12, as well as with audible signals to the operator.

Lens or mask 14 covers all or part of the instrument cluster assembly 12 and may be optically clear or tinted. In the embodiment shown, lens 14 has at least one light pick up 26 arranged in the perimeter region of lens 14. Lens 14, which may be made of plastic, acts as a light pipe, transmitting light near a perimeter edge in a longitudinal direction. In the embodiment shown, light pickups 26 protrude slightly from the general perimeter of lens 14 and then bend approximately 90° to face inward towards the instrument cluster assembly 12 and underlying PWB 20. The light pickups 26 are arranged about the perimeter of lens 14 to complement the positioning of light sources 22 similarly arranged about the perimeter of the instrument cluster assembly 12. When light source 22 emits light, the edge of light pickup 26 receives the emitted light and transmits it longitudinally up and around the bend, and through to the main portion of the lens 14. The light sources 22 are hidden from operator view. In the shown embodiment, the protruding light pickups 26 are also shielded from operator view by trim or molding common in the art.

Figure 2:
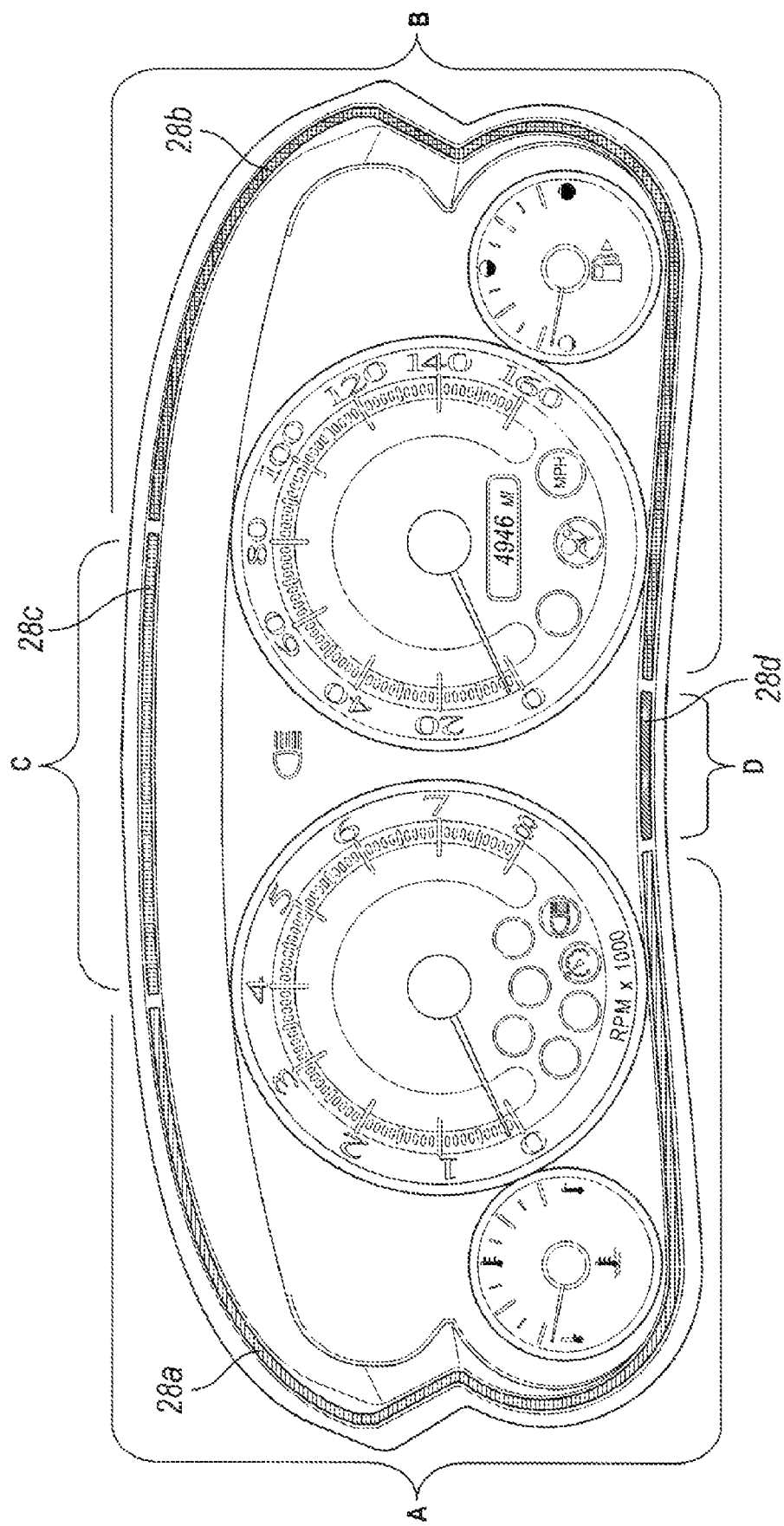
FIG. 2 is a front view of an instrument gauge assembly and lens adapted for zone lighting.

Lens 14 has on one or both of its surfaces a molded surface detail or interruption 28. This surface interruption picks up and is illuminated by light emitted by light source 22 and transmitted through the lens 14. Surface interruption 28 may be arranged in a variety of manners. In the embodiment shown in FIG. 1, surface interruption 28 is configured as a continuous line near the perimeter of lens 14. FIG. 2 shows another embodiment where surface interruption 28 is delimited into four zones A, B, C, and D. Surface interruption 28 could be created by molding in a texture into the lens such as in fabrication of a plastic lens 14, or surface interruption 28 could be cut, etched, stamped, or otherwise formed after the molding process. Further, the surface interruption 28 could be introduced by applying a substance such as paint to lens 14. The color area can be a controlled distinct line, a graphical image, or a diffused area. Special effects can be controlled by the size of radii of the cut or mold in lens 14, the height of an element, angle of chamfers, and material selection and application technique of paint or other surface interruption.

In the perimeter-type embodiment shown in FIG. 1, a plurality of light sources 22 are arranged around the perimeter of instrument cluster assembly 12. "Plurality of light sources" as used herein, includes a single LED which is capable of emitting multiple colors. In accordance with the light sources 22, a like number of light pickups 26 are arranged around the perimeter of the lens 14. In one embodiment, the light sources 22 are comprised of tri-color LEDs which may emit, for example, red, yellow and/or blue light.

When controller 24 sends a signal to a symbol 18 that, for example, engine oil pressure has dropped to a dangerously low level, a red low oil pressure symbol 18 illuminates on instrument cluster assembly 12. In the perimeter embodiment, the controller 24 would simultaneously cause light sources 22 to emit a red-color light from the tri-color LEDs. The red light emitted would be picked up by the plurality of light pickups 26, which would then be transmitted longitudinally through the lens until the light encountered surface interruption 28, which would then illuminate a red band of light according to the surface interruption detail. The same process would occur if the controller 24 sent a less severe warning signal, such as an engine maintenance reminder, corresponding to a yellow light. In that case, the controller 24 would send a signal to light sources 22 to emit a yellow light, which would then be picked up by light pickups 26, transmitted through lens 14 to the surface interruption 28, which would illuminate a yellow band around the perimeter of lens 14. Similar processes could occur for other types of conditions, such as a blue light indicating that the vehicle's high-beam headlights were on, or a green light indicating that all-wheel drive was engaged.

In the event that multiple warnings occur at one time, controller 24 could be programmed to cycle through the different colors as needed. The system could also be programmed to flash the light or increase its intensity or frequency when the system deemed the matter to be highly urgent.

When controller 24 indicates that no symbols 18 require illumination, light sources 22 would not emit light and no portion of lens 14 would illuminate, with surface interruption 28 having a decorative aspect appearing as surface detail. In this mode, the lens would show no color except when used for color messaging and would not distract from the gauges beneath.

The system may be adapted to be used as ambient or decorative lighting for aesthetic purposes. For example, the operator could select an ambient light mode so that the perimeter of the lens produced a muted aesthetically pleasing color, or cycled through various colors. Further, the operator might choose to turn off the color messaging system entirely. Where the color messaging system may be enabled or disabled by the operator, a separate color messaging light 30 may be placed on the instrument cluster assembly to indicate the status of the color messaging system.

As noted above, FIG. 2 shows an enhanced instrument panel having a color messaging lens configured in zones. In this embodiment, the area of surface interruption designated A could correspond to an area which illuminates in red in response to a more serious abnormal operating condition. The surface interruption in zone B could illuminate in yellow, corresponding to a less serious operating condition or an advisement to check the engine or change an air filter, for example. The zone indicated as zone C could illuminate a blue color corresponding to a high beam indicator. The zone indicated as D could illuminate in green reinforcing a symbol 18 communicating a "normal" operating status such as a traction control system being automatically engaged.

An advantage of a zone application is that an operator can become accustomed to certain zones of the dashboard relaying information of consistent importance. In the foregoing example, a color-blind person would know when the A region illuminates that a more serious warning is being communicated. Similarly, a vehicle operator could readily learn that when the B zone illuminates, (in yellow) a less serious abnormal operating condition is present. Such coordination of large area color messaging in combination with illumination of much smaller symbols clearly and consistently apprises an operator, including a color-blind operator, of the seriousness of the warning by reference to position as well as by color.

In another embodiment, a portion of lens 14 could be illuminated by electrical current passing through an electroluminescent material applied to a portion of lens 14, said current being provided in response to a signal such as an abnormal operating condition signal.

While the above description constitutes one or more embodiments of the present invention, it will be appreciated that the invention is susceptible to modification, variation and change without departing from the proper scope and fair meaning of the accompanying claims.

The invention claimed is:

1. An instrument gauge assembly of a type having an instrument cluster comprising indicators and visible symbols and in communication with a controller, said instrument gauge assembly comprising:
   a lens covering at least a portion of the instrument cluster and capable of carrying light longitudinally from its edge,
   a light source in communication with the controller,
   a light pickup formed on the lens and having an edge portion proximate to the light source, and
   an interruption on a surface of the lens which illuminates with light transmitted within the lens by the light source, wherein the interruption on the surface of the lens is in the perimeter region of the lens which is visible to an operator.

2. The assembly of claim 1, wherein the light transmitted by the light source is colored.

3. The assembly of claim 2, further comprising an abnormal operating condition signal communicated by the controller, wherein the light source illuminates the surface interruption in response to the abnormal operating condition signal.

4. The assembly claim 3, wherein the controller is programmed to cause the light source to intensify or blink as an abnormal operating condition persists or becomes more urgent.

5. The assembly of claim 1, wherein the lens is made of plastic.

6. The assembly of claim 1, comprising a plurality of light sources and a plurality of light pickups.

7. The assembly of claim 1, wherein the surface interruption is etched or molded into the lens.

8. The assembly of claim 1, wherein the surface interruption comprises a material applied onto the lens.

9. The assembly of claim 1, wherein the light source is an LED.

10. The assembly of claim 1, wherein the lens covers substantially the entire instrument cluster.

11. The assembly of claim 1, wherein the surface interruption is configured to produce a clear and distinct line or pattern of illumination.

12. The assembly of claim 1, wherein the surface interruption is configured to produce a diffused area of illumination.

13. An instrument gauge assembly of a type having an instrument cluster comprising indicators and visible symbols and in communication with a controller, said instrument gauge assembly comprising:
- a lens covering at least a portion of the instrument cluster and capable of carrying light longitudinally from its edge,
- a plurality of light sources in communication with the controller,
- a plurality of light pickups formed on the lens, each of the light pickups having an edge portion proximate to at least one of the light sources, wherein at least one of the light pickups has an edge portion proximate to more than one of the light sources whereby light is first received by the at least one light pickup from the more than one light sources, the more than one light sources being capable of emitting different colored light, and
- an interruption on a surface of the lens which illuminates with light transmitted within the lens by the light source.

14. The assembly of claim 13, further comprising a first portion of the lens having a first surface interruption zone associated with a first light color and a second portion of the lens having a second surface interruption zone associated with a second light color.

15. The assembly of claim 13, wherein at least one of the plurality of more than one light sources is itself configured to emit a plurality of colors.

16. The assembly of claim 13, wherein an operator can select at least one illumination color or color sequence from the plurality of light sources.

17. An instrument gauge assembly of a type having an instrument cluster comprising indicators and visible symbols and in communication with a controller, said instrument gauge assembly comprising:
- a lens covering at least a portion of the instrument cluster and capable of carrying light longitudinally from its edge,
- a light source in communication with the controller,
- a light pickup formed on the lens and having an edge portion proximate to the light source, and
- an interruption on a surface of the lens which illuminates with light transmitted within the lens by the light source; and
- an operator switch in communication with the controller and configured to modify or disable the illumination of the surface interruption.

* * * * *